United States Patent [19]

Ogino et al.

[11] 4,396,001
[45] Aug. 2, 1983

[54] COMBUSTION DEVICE

[75] Inventors: Toshiro Ogino, Sakurai; Ohmukai Yoshimi, Hirakata; Yoshimura Masukazu, Nara; Hori Makoto, Ikoma, all of Japan

[73] Assignee: Matsushita Electric Industrial Co., Ltd., Kadoma, Japan

[21] Appl. No.: 235,030

[22] Filed: Feb. 17, 1981

[30] Foreign Application Priority Data

Feb. 15, 1980 [JP]  Japan .................................. 55-18102

[51] Int. Cl.³ .............................................. F24C 5/04
[52] U.S. Cl. .............................. 126/96; 126/110 AA; 126/110 C
[58] Field of Search ............... 126/96, 110 AA, 110 C

[56] References Cited

U.S. PATENT DOCUMENTS

| 1,027,210 | 5/1912 | Mongen | 126/110 C |
| 1,214,547 | 2/1917 | Jeavons | 126/96 |
| 1,380,135 | 5/1921 | Corbin | 126/110 AA |
| 2,271,076 | 1/1942 | Hupfer | 126/96 |
| 2,433,829 | 1/1948 | Doering | 126/96 |
| 2,671,439 | 3/1954 | Foster | 126/96 |

FOREIGN PATENT DOCUMENTS 558249 12/1943 United Kingdom ........... 126/110 C

Primary Examiner—Daniel J. O'Connor
Attorney, Agent, or Firm—Wenderoth, Lind & Ponack

[57] ABSTRACT

A combustion device has a negative pressure combustion burner and an ejector air flow generating mechanism and is designed so that the warm air flow rate is approximately proportional to the combustion rate. The device is simple in construction, and by controlling the warm air flow rate it is possible to adjust the heat output of the device while maintaining the temperature of warm air at a constant value. The device disclosed herein is particularly suitable for use as an air circulation type room heater.

5 Claims, 7 Drawing Figures

COMBUSTION DEVICE

BACKGROUND OF THE INVENTION

In combustion devices using liquid fuels, such as kerosene, the air for combustion should be supplied at such a rate as to provide a constant air-fuel ratio equivalent to the stoichiometric ratio. However, it has heretofore been very difficult to supply air at a predetermined rate in a stabilized manner because of the influences of the wind and the like. This results in too little or too much air being supplied, degrading the combustion state to the extent of increasing the amount of toxic substances in the exhaust gases, lowering the heat efficiency and, in extreme cases, making it impossible for the combustion to continue.

Such problems, which are due to variations in the air-fuel ratio, also occur when the fuel supply rate is changed. More particularly, the adjustment of the combustion state is effected by adjusting the atomization rate in the gun type, the injection rate in the pot type and the fuel vaporization area in the wick type, all using liquid fuels, and in the case of the types using gas fuels, it is effected by adjusting the gas flow rate. In either case, the rate of fuel supply to the combustion section is adjusted. If, therefore, the air supply rate is constant, there is a danger of producing variations in the air-fuel ratio, thus causing said problems. As a result, the range in which the combustion rate can be adjusted is limited by the air-fuel ratio and this range cannot be widened without sacrificing the optimum air-fuel ratio to some extent, which would aggravate the combustion state. Further, even if the air-fuel ratio is within said range, it can deviate from the optimum value, in which case it is liable to be influenced by the wind.

Since the conventional adjustment of the combustion rate is effected by directly increasing or decreasing the fuel supply rate, the adjusting device, particularly for combustion devices using liquid fuels, inevitably comes in contact with the liquid fuel and eventually malfunctions as it is corroded by the water present in the liquid fuel, by organic acids produced by degradation of the liquid fuel and/or by tarry materials adhering thereto, and the maintenance and inspection thereof have been difficult.

There is also a known combustion device of the type in which the fuel and air supply rates are correlatively adjusted by mechanical damper control means. However, the construction is complicated and, moreover, as the air flow rate decreases, the range becomes narrower in which the rate of supply of fuel required for maintaining the air-fuel ratio at the proper value is allowed to vary. In combustion devices using said mechanical opening control means, therefore, there have been problems, such as high accuracy being required in designing and producing the device.

SUMMARY OF THE INVENTION

The present invention solves the problems described above. Accordingly, a first object of the invention is to provide a combustion device comprising a single airflow generating mechanism (hereinafter referred to as a fan) driven to generate carrier air flow for warm air (hereinafter referred to briefly as carrier air flow) to thereby provide the air for combustion to be used in a burner, said burner being of the construction in which the supply fuel flow rate varies with the flow rate of air for combustion so that by controlling the warm air flow rate the combustion rate can be automatically changed to adjust the heat output and warm air flow at a constant temperature can be obtained, thus ensuring comfortable room heating effects.

A second object of the invention is to provide a combustion device which is simple in construction and with which it is easy to maintain the air-fuel ratio in the proper range, said device being easy to design and ensuring a satisfactory burning state.

A third object of the invention is to provide a combustion device wherein even if the heat output (combustion rate) is controlled over a wide range, the proper air-fuel ratio can be obtained, so that the heat output adjusting range is wide.

A fourth object of the invention is to provide a combustion device which is so constructed that the air for combustion in a burner is drawn by the action of a negative pressure produced by carrier air flow from a fan, so that the combustion cylinder (chimney) of the burner may be decreased in length to a minimum.

A further object of the invention is to provide a combustion device wherein the combustion rate can be adjusted by controlling the flow rate of air from a fan and there is no problem, such as malfunction, inherent in the conventional type which directly increases and decreases the fuel supply rate.

DETAILED DESCRIPTION OF THE PREFERRED EMBODIMENT

Figure 1:
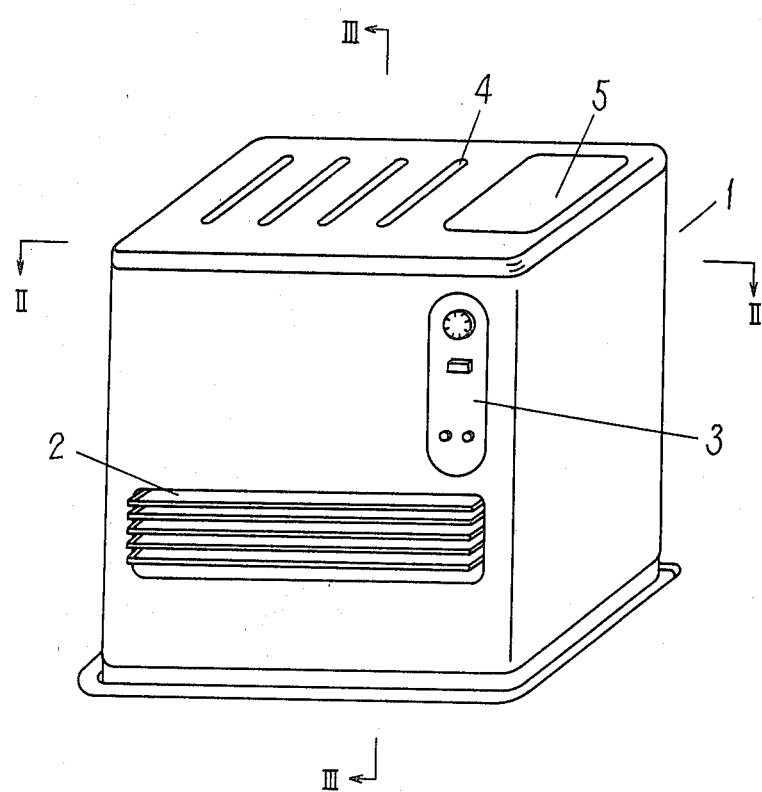
FIG. 1 is a front perspective view of an air circulation type room heater according to an embodiment of the present invention.

The invention will now be described with reference to an embodiment thereof applied to an air circulation type room heater using a liquid fuel, e.g., kerosene, shown in the drawings.

Figure 2:
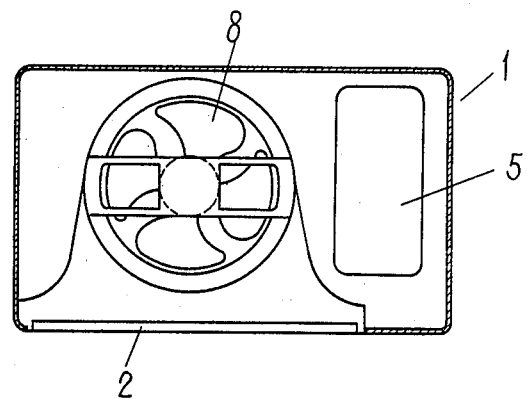
FIG. 2 is a section taken along the line II—II of FIG. 1.
Figure 3:
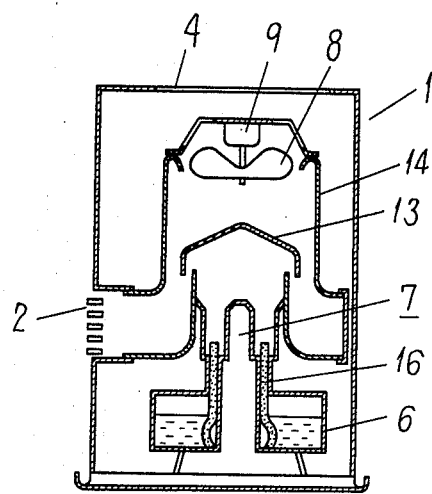
FIG. 3 is a section taken along the line III—III of FIG. 1.

In FIG. 1, a room heater body 1 has, on its front surface, a warm air outlet port 2 and an operating section 3 and, on its upper surface, an air suction port 4 and a fuel tank cartridge receiving section 5. In FIGS. 2 and 3, the room heater body 1 is provided with a fuel tank 6 in its lower region and a burner 7 disposed thereabove and a fan motor 9 disposed above the latter for driving a propeller fan 8. As shown in detail in FIG. 4, the burner 7 is of the multi-cylinder type having a plurality of cylindrical members; it comprises an inner flame cylinder 10, an outer flame cylinder 11, a combustion cylinder 12 surrounding said flame cylinders, an air control plate 13 disposed above said combustion cylinder, an outer cylinder 14 surrounding said combustion cylinder and upwardly extending close to said fan 8, and a cylindrical wick 16 with its lower end immersed in a liquid fuel 15, such as kerosene, contained in said fuel tank 6 and with its upper end exposed between said inner and outer flame cylinders 10 and 11, serving as a vaporizer for the liquid fuel 15. The inner and outer flame cylinders 10 and 11 have primary air ports consisting of vaporizing air ports 10a, 11a and premixing air ports 10b, 11b and secondary air ports 10c, 11c, respectively. The vaporizing air ports 10a, 11a are positioned adjacent and opposed to the upper end of the wick 16, the premixing air ports 10b, 11b are positioned above said vaporizing air ports, and the secondary air ports 10c, 11c are positioned above said mixing air ports. An inner passage 17 in the inner flame cylinder 10 and a passage 18 between the outer flame cylinder 11 and the combustion cylinder 12 communicate with the air suction port 4 through a space defined by the inner surface of the outer case of the room heater body 1. The air control plate 13 is somewhat larger than the diameter of the combustion cylinder 12, so that a passage 19 is defined between the air control plate 13 and the combustion cylinder 12. A space surrounded by the inner and outer flame cylinders 10, 11, combustion cylinder 12 and air control plate 13 defines a combustion chamber 20. Further, the outer cylinder 14 serves as a blown air guide, while a passage 21 between the outer cylinder 14 and the combustion cylinder 12 serves as a warm air passage which communicates with said warm air outlet port 2.

In the burner 7 of this construction, the primary air ports, which consist of the vaporizing air ports 10a, 11a and premixing air ports 10b, 11b, and the secondary air ports 10c, 11c are suitably arranged so that the primary air and secondary air are in desirable proportions. In this connection, recommendable proportions are such that the amount of primary air is 0.1-0.2 of the total amount of primary and secondary air. The burner 7 is of the negative pressure combustion type in which the air for combustion (primary and secondary air) is drawn by the carrier air flow from the fan 8. The rate of vaporization of the liquid fuel 15 from the wick 16 is approximately proportional to the flow rate of vaporizing air passing through the vaporizing air ports 10a, 11a. This means that the burner 7 of the invention ensures that the combustion rate is approximately proportional to the combustion air flow rate.

Figure 4:
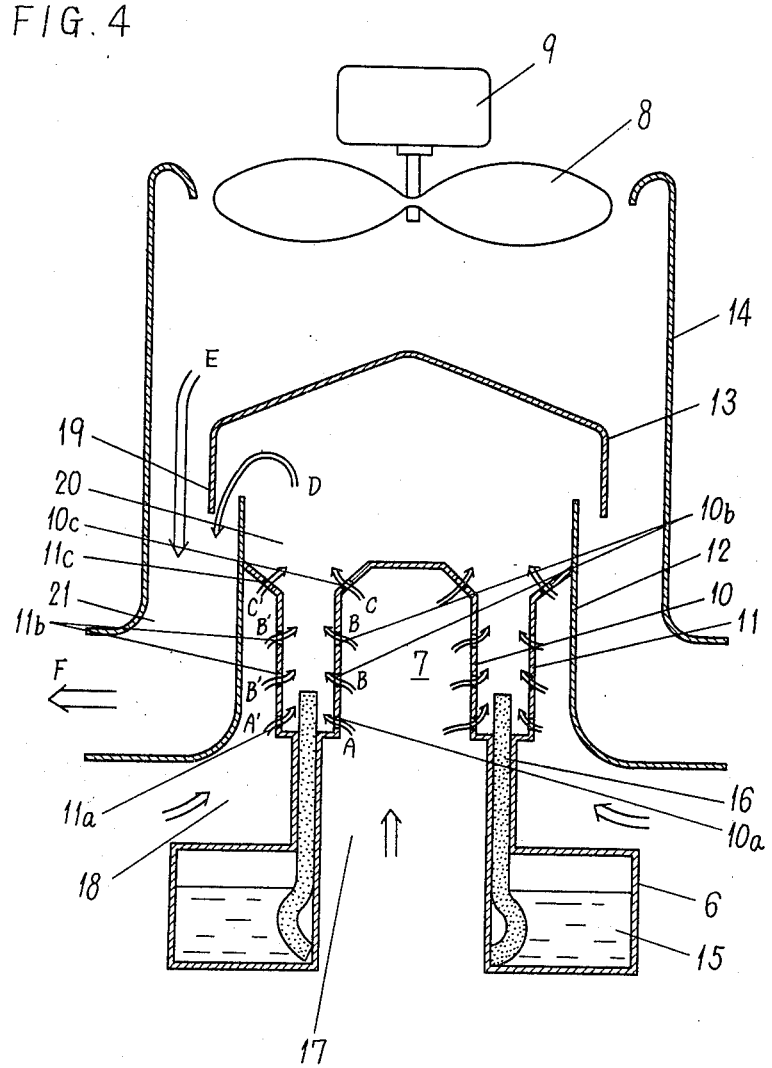
FIG. 4 is a sectional view showing a burner section in an embodiment of the invention.

Arrows shown in FIG. 4 indicate air flows; arrows A, A' for vaporizing air flow passing through the vaporizing air ports 10a, 11a, arrows B, B' for premixing air flow passing through 10b, 11b, arrows C, C' for secondary air flow passing through the secondary air ports 10c, 11c, an arrow D for combustion product air flow passing through the passage 19, an arrow E for carrier air flow generated by the fan 8, and an arrow F for warm air flow consisting of said carrier air flow E and combustion product air flow D.

The functioning of the room heater with the burner 7 of the above construction being fired will now be described.

The motor fan 9 is driven to rotate the propeller fan 8 to generate carrier air flow E passing through the passage 19, with the result that the interior of the combustion chamber 20 becomes a negative pressure region, which sucks the air for combustion consisting of the primary air flow (i.e., vaporizing air flows A, A' and premixing air flows B, B') and secondary air flows C, C' from the passages 17 and 18 via the air ports 10a, 10b, 10c and 11a, and 11b, 11c. The flow rate of air for combustion is proportional to the flow rate of carrier air flow E. On the other hand, the vaporization rate of liquid fuel 15 from the wick 16 is approximately proportional to the flow rates of vaporizing air A, A'. As described above, since the flow rate of carrier air E is proportional to the flow rate of air for combustion and since the ratio of the flow rate of primary air (consisting of vaporizing air and premixing air) to the flow rate of secondary air is constant, it follows that the vaporization rate of liquid fuel 15 from the wick 16 is approximately proportional to the flow rate of carrier air E. Accordingly, the combustion rate in the burner 7 in the combustion chamber 20 can be adjusted by increasing or decreasing the flow rate of air from the fan 8.

The carrier air flow E and combustion product air flow D jointly form the warm air flow F which is then blown out of the warm air outlet port 2. In this way, the combustion rate depends on the flow rate of carrier air flow, so that warm air whose temperature is approximately constant can be obtained.

Figure 5:
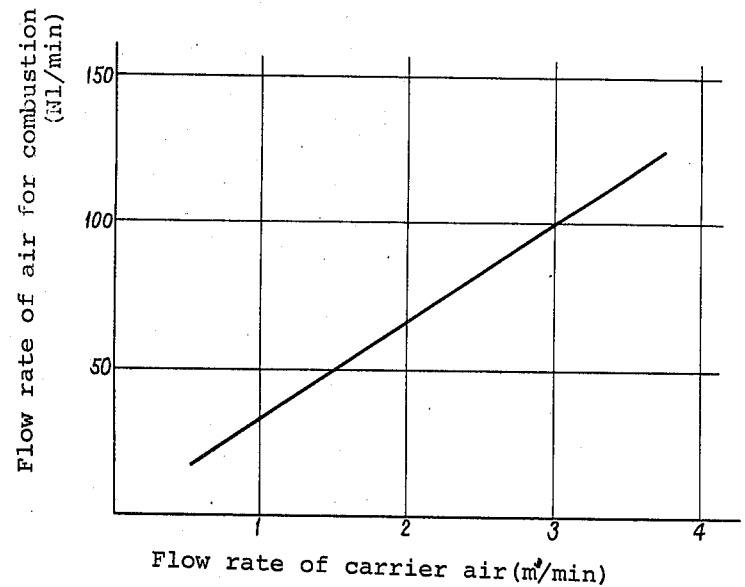
FIG. 5 is a graph showing characteristics of the flow rate of carrier air versus the flow rate of air for combustion, illustrating the functioning of the present device.
Figure 6:
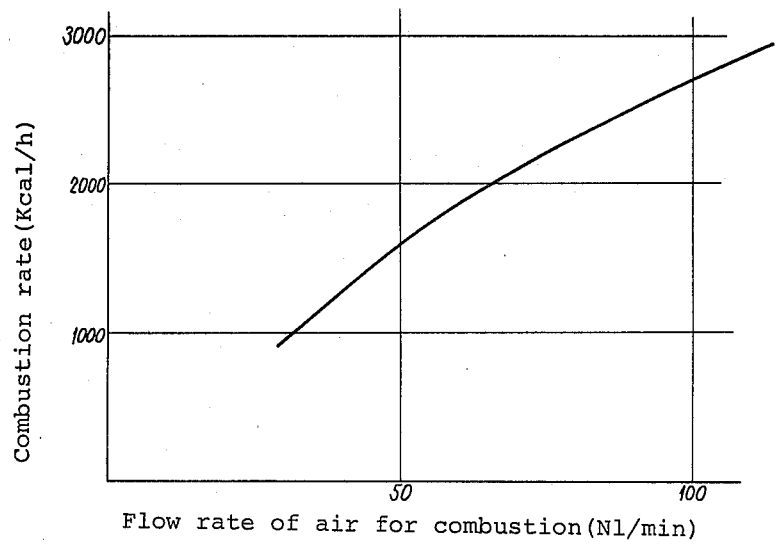
FIG. 6 is a graph showing characteristics of the flow rate of air for combustion versus the combustion rate.
Figure 7:
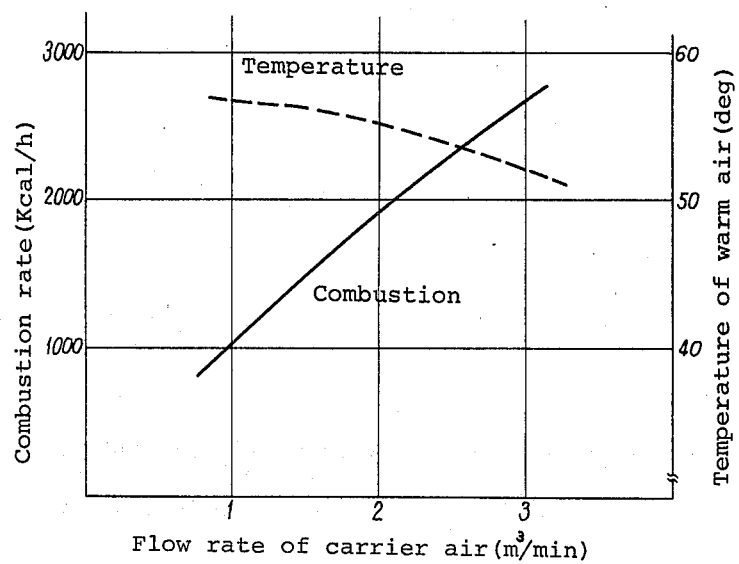
FIG. 7 is a graph showing characteristics of the flow rate of air for combustion versus the combustion rate and the temperature of warm air.

This functioning is illustrated in more detail in FIGS. 5 through 7. As shown in FIG. 5, the flow rate of air for combustion is approximately proportional to the flow rate of carrier air, and as shown in FIG. 6, the combustion rate is approximately proportional to the flow rate of air for combustion. Therefore, as shown in FIG. 7, the combustion rate is proportional to the flow rate of carrier air and the temperature of warm air is approximately constant.

Further, according to the burner of the invention, since the vaporization of the liquid fuel 15 is proportional to variations in the flow rate of air for vaporization, the air-fuel ratio is maintained constant during combustion. More particularly, when the air for vaporization mixes with the fuel vapor, this causes the vapor pressure on the surface of the wick 16 to decrease. In this situation, variations in the flow rate of air for vaporization produce variations in the gas phase vapor pressure, thus varying the vapor pressure difference between the liquid and gas phases and automatically controlling the vaporization rate of liquid fuel 15 such that it varies with the air flow rate. The response of this phenomenon is sufficently quick to cope with a transient, sudden change in the air flow rate. Therefore, there is no danger of the operation being influenced by the wind and satisfactory combustion can be attained with a constant air-fuel ratio. Further, as compared with the conventional burner using a mechanical damper or the like for controlling the air-fuel ratio, the burner of the present invention is simple in construction and easy to design.

Further, as compared with the conventional type in which the supply rate of liquid fuel itself is adjusted when it is desired to adjust the combustion rate, the present invention maintains the combustion with a constant The described arrangement for sucking the air for combustion by a negative pressure makes it unnecessary to use a long combustion cylinder for obtaining a combustion draft as in the conventional arrangement.

Further, because of the present arrangement enabling the adjustment of the combustion rate to be made on the air supply side, the invention encounters no such operating problems as are caused by the conventional adjustment made on the liquid fuel side.

Further, the burner of the invention does not need preheating for the purpose of vaporizing the fuel, thus saving electric power.

In the embodiment described above, the surface provided by the upper end of the wick 16 and exposed in the space between the inner and outer flame cylinders 10 and 11 effects the vaporization of liquid fuel 15. The area of this surface is maintained constant during combustion. Though not illustrated, ignition is effected by some ignition means. As for putting out the fire, this may be effected by lowering the wick 16.

Though not illustrated in the embodiment, a thermostat may be provided for detecting the room temperature so as to control the driving of the fan motor 9, in which case the room temperature can be conrtrolled to a constant value by a simple arrangement without using any special proportional control means.

The burner in the above embodiment has been shown as being of the negative pressure combustion type which is adapted to suck the air for combustion, but the invention is not limited thereto. For example, it may be of the type adapted to force out the air for combustion.

Further, the above embodiment has been described with reference to a combustion device using a liquid fuel, but the invention is also applicable to a combustion device using a gas fuel arranged so that the gas fuel supply rate is variable by means of vaporizing air flows A, A' shown in FIG. 4.

As has been described so far, the combustion device of the present invention is characterized in that it comprises a burner which ensures that the combustion rate is approximately proportional to the flow rate of air for combustion, and a fan for producing carrier air flow by which the air for combustion in said burner is generated in proportion to the flow rate of carrier air, the temperature of warm air is constant and the heat output can be adjusted by controlling the air flow rate, thus ensuring comfortable room heating. Further, the present combustion device is simple in construction and ensures satisfactory combustion with a constant air-fuel ratio.

What is claimed is:

1. A device for warming air, comprising:
    a burner means having an air deflecting plate, an outer wall adjacent said air deflecting plate and defining with said air deflecting plate a combustion chamber, the edges of said air deflecting plate and said outer wall being spaced to define an outlet from said combustion chamber;
    a burner constituted by an outer cylindrical wall and an inner cylindrical wall spaced from said outer cylindrical wall to define an annular flame forming space therebetween and opening into said combustion chamber, and a wick extending into said flame forming space, the outside surface of said outer cylindrical wall and the inner surface of said inner cylindrical wall being exposed to the space outside said combustion chamber, said inner and outer cylindrical walls having vaporizing air ports therein adjacent said wick where it extends into said flame forming space, and premixing air ports therein immediately past the end of the wick in the flame forming space;
    means for supplying a vaporizable fuel to said wick; and
    means for directing a flow of air to be warmed against the outside of said deflecting plate for being deflected past said outlet for producing a negative pressure in said combustion chamber, whereby the flow of air to be warmed past the outlet causes combustion air to be drawn through said ports in said cylindrical walls, which causes fuel to be dispensed from the wick and burned in proportion to the flow of the air to be warmed past said outlet.

2. A device as claimed in claim 1 in which said ports further comprise secondary air ports spaced from said premixing air ports in the direction toward said combustion space.

3. A device as claimed in claim 1 in which said air deflecting plate forms an end wall of said combustion space spaced axially of said burner from said flame forming space and having an outer periphery depending toward said burner, the outer wall around said combustion space being spaced inwardly from the depending outer periphery of said air deflecting plate, and said air flow generating means is on the opposite side of said air deflecting plate from said combustion space for blowing the air to be warmed toward said air deflecting plate.

4. A device as claimed in claim 3 in which said air flow generating means is a propeller type fan.

5. A device as claimed in claim 4 in which said flame forming space is directed upwardly and said air deflecting plate forms a top wall of said combustion space and said fan is directed downwardly.

* * * * *